US006755225B1

(12) United States Patent
Niedwiecki et al.

(10) Patent No.: US 6,755,225 B1
(45) Date of Patent: Jun. 29, 2004

(54) TRANSPORTABLE HYDROGEN REFUELING STATION

(75) Inventors: Alan Niedwiecki, Newport Beach, CA (US); Neel Sirosh, Irvine, CA (US); Andy Abele, San Clemente, CA (US)

(73) Assignee: Quantum Fuel Systems Technologies Worldwide, Inc., Irvine, CA (US)

( * ) Notice: Subject to any disclaimer, the term of this patent is extended or adjusted under 35 U.S.C. 154(b) by 0 days.

(21) Appl. No.: 10/350,583

(22) Filed: Jan. 24, 2003

(51) Int. Cl.[7] .................................................. B65B 1/04
(52) U.S. Cl. .......................... 141/231; 141/82; 141/2; 141/18
(58) Field of Search .............................. 141/231, 82, 2, 141/18; 62/50.2, 50.3

(56) References Cited

U.S. PATENT DOCUMENTS

| | | | | |
|---|---|---|---|---|
| 5,107,906 A | * | 4/1992 | Swenson et al. .............. 141/11 |
| 5,505,232 A | * | 4/1996 | Barclay ........................ 141/11 |
| 5,603,360 A | * | 2/1997 | Teel ............................. 141/21 |
| 5,954,099 A | * | 9/1999 | Princiotta et al. ............. 141/18 |
| 6,305,442 B1 | | 10/2001 | Ovshinsky et al. |
| 6,432,283 B1 | | 8/2002 | Fairlie et al. |

OTHER PUBLICATIONS

United States Department of Energy document entitled "Toward a More Secure and Cleaner Energy Future, A National Vision Of America's Transition To A Hydrogen Economy to 2030 And Beyond, Based on the results of the National Hydrogen Vision Meeting Washington, DC, Nov. 15–16, 2001", dated Feb. 2002, 35 pages.

* cited by examiner

Primary Examiner—Steven O. Douglas
(74) Attorney, Agent, or Firm—Mark H. Krietzman; Greenberg Traurig LLP

(57) ABSTRACT

A portable hydrogen refueling stations which can dispense gaseous hydrogen from one or more internal high pressure tanks. The refueling station can be refilled with a lower pressure hydrogen gas feed and then compressed for storage within the refueling station.

13 Claims, 8 Drawing Sheets

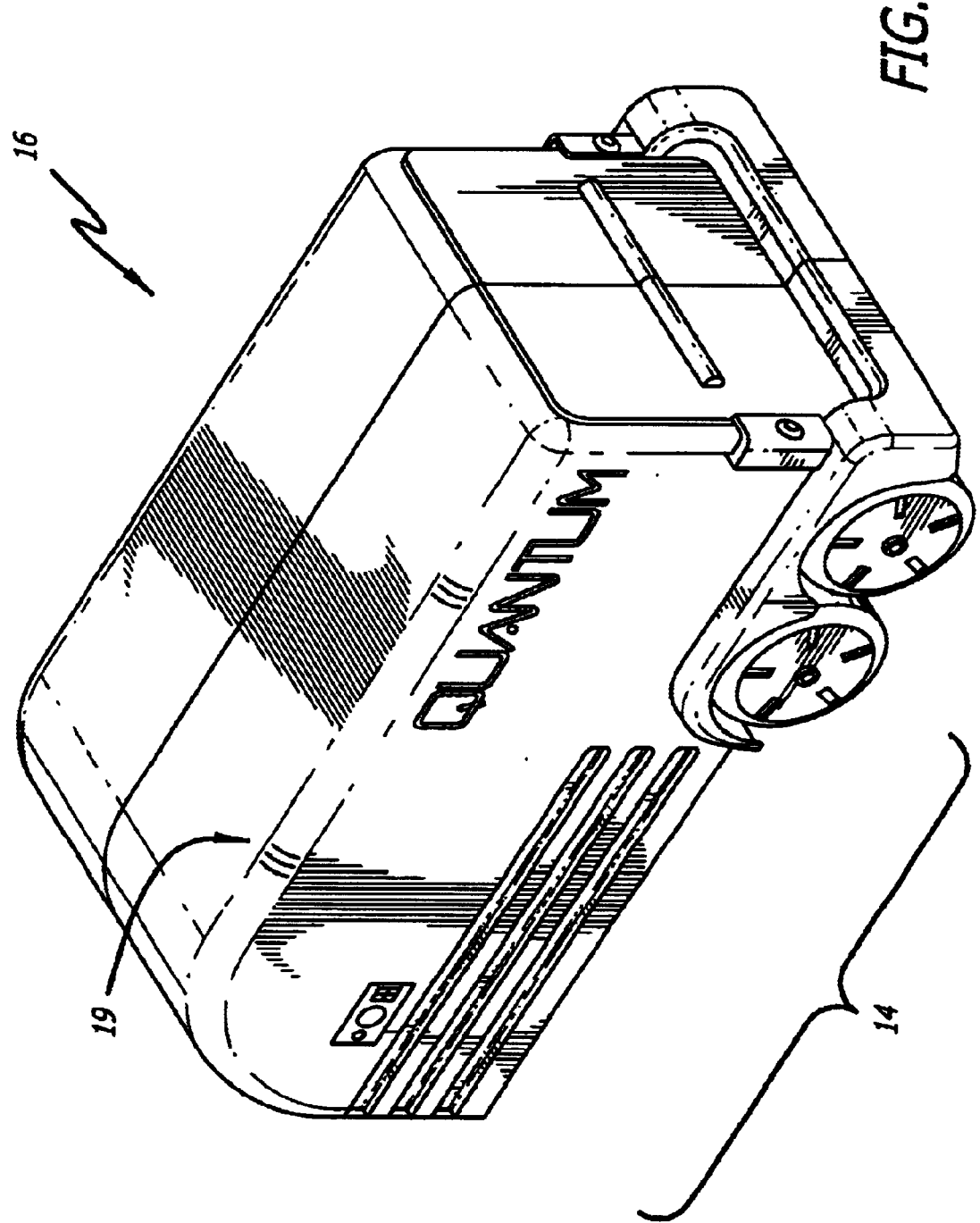

FIG. 2A

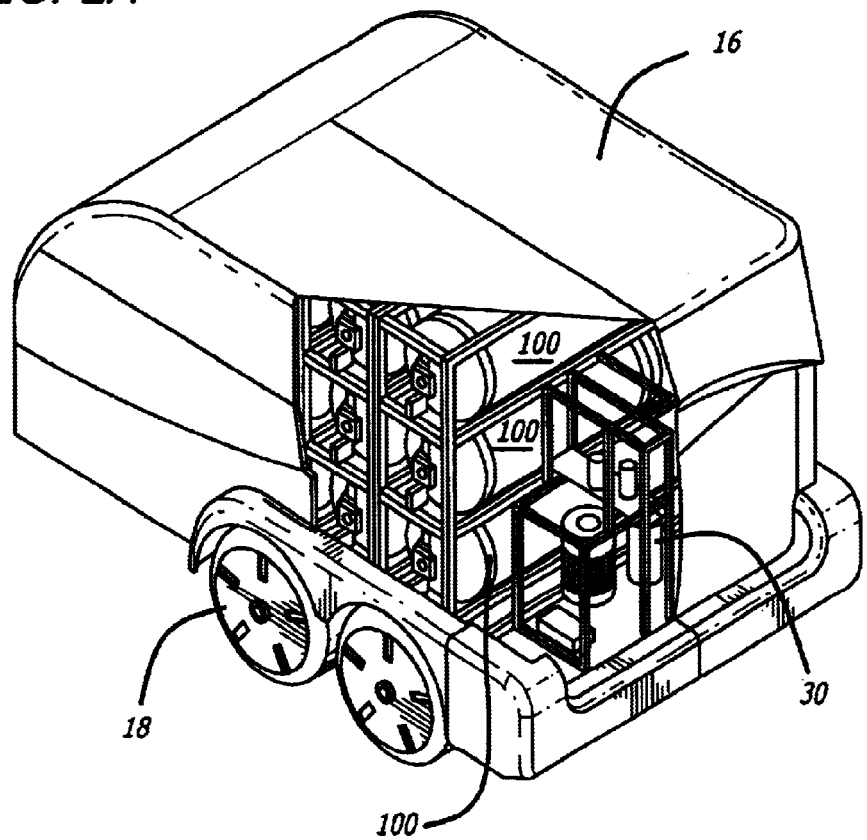

| Specifications | Option A | Option B |
|---|---|---|
| Hydrogen Storage | 40 kg | 80 kg |
| Storage Method | 2 TriPacs (1,500 L) | 4 TriPacs (1,500 L) |
| Overall Length | 15 feet | 17 feet |
| Curb Weight of HyHauler | 4,000 lbs. | 5,500 lbs. |
| Power Requirement (US Grid) | 10 kW (208 V, 3 Phase, 30 A or 240 V, 1 Phase, 50 A) | 10 kW (208 V, 3 Phase, 30 A or 240 V, 1 Phase, 50 A) |
| Number of vehicles consecutively filled at 2 kg/vehicle (5,000 psi) | 10-11 | 25-26 |
| Number of vehicles consecutively filled at 5 kg/vehicle (5,000 psi) | 3-4 | 9-10 |
| Number of vehicles consecutively filled at 3 kg/vehicle (10,000 psi) | 5-6 | 15-16 |
| Time to recharge HyHauler | 20 kg in 2-15 hrs. | 40 kg in 3-24 hrs. |

FIG. 2B

| | |
|---|---|
| Number of Tubes | 10-Tube |
| Hydrogen capacity | 137,580 scf (717 lb) |
| Height | 10 ft. 6 in. |
| Chassis & Tube Weight (3AAX) | 60,000 lbs. |
| Overall Length | 44 ft. 0 in. |
| Overall Width | 8 ft. 0 in. |
| Chassis Weight | 10,000 lbs. |
| Tube Diameter | 22 in. |
| Tube Length (3AAX) | 36 ft. 0 in. |
| Tube Specification | DOT 3AAX-2400 |
| Avg. Tube Weight (3AAX) | 5,000 lbs. Heavy Wall |
| Tube Nominal Water Volume (3AAX) | 81.6 cf Heavy Wall |
| Avg. Operating Pressure (3AAX) | 2,706 psig Heavy Wall |

*FIG. 3B*

| Specifications | Option C | Option D |
|---|---|---|
| Hydrogen Storage | 40 kg | 80 kg |
| Storage Method | 2 TriPacs | 4 TriPacs |
| Overall Length | 16 feet | 20 feet |
| Curb Weight of HyHauler Plus | 7,000 lbs. | 9,200 lbs. |
| Power Requirement (US Grid) | 10 kW compressor, 50 kW electrolyzer (480 V, 3 Phase, 80 kVA) | 10 kW compressor, 50 kW electrolyzer (480 V, 3 Phase, 80 kVA) |
| Number of vehicles consecutively filled at 2 kg/vehicle (5,000 psi) | 10-11 | 25-26 |
| Number of vehicles consecutively filled at 5 kg/vehicle (5,000 psi) | 3-4 | 9-10 |
| Number of vehicles consecutively filled at 3 kg/vehicle (10,000 psi) | 5-6 | 15-16 |
| On-board $H_2$ production rate | 1 kg/hr. | 1 kg/hr. |
| Temperature Range (Electrolyzer) | 36 to 104°F | 36 to 104°F |

*FIG. 5B*

TRANSPORTABLE HYDROGEN REFUELING STATION

FIELD OF THE INVENTION

This invention relates to a rechargeable device for storing and, when desired, releasing hydrogen. Among other applications, the device can be used in the energy generation or transportation industries.

BACKGROUND OF THE INVENTION

A hydrogen economy has become a National vision. "Hydrogen has the potential to solve two major energy challenges that confront America today: reducing dependence on petroleum imports and reducing pollution and greenhouse gas emissions. There is general agreement that hydrogen could play an increasingly important role in America's energy future. Hydrogen is an energy carrier that provides a future solution for America." A National Vision of America's Transition to a Hydrogen Economy to 2030 and Beyond, based on results of the National Hydrogen Vision Meeting, Washington, D.C., Nov. 15–16, 2001— United States Department of Energy February 2002

For mobile hydrogen powered systems, i.e., fuel cell powered electric vehicles, hydrogen must be obtainable.

In U.S. Pat. No. 6,305,442, issued to Ovshinsky, a hydrogen infrastructure system is proposed. It teaches hydrogen bound to a metal alloy hydride. Release and storage of hydrogen bound to the hydride is a process which requires energy. Ovshinsky states that a major drawback of hydrogen as a fuel in mobile uses, such as powering of vehicles, is the lack of an acceptable lightweight hydrogen storage medium. Ovshinsky identifies hydrogen vessels as heavy, and having a "very great" explosion/fire hazard. Further, Ovshinsky identifies pressurized tankers as an unacceptable medium for transporting all but smaller quantities of hydrogen due to susceptibility to rupturing and explosion.

Accordingly, a hydrogen storage medium without necessitating the use of hydrides that is relatively lightweight and safe would be desirous.

A hydrogen replenishment system is taught in U.S. Pat. No. 6,432,283 issued to Fairlie et al. Fairlie teaches an electrolytic cell which produces oxygen gas during gaseous hydrogen production. The Fairlie system vents gaseous oxygen during the dispensing of hydrogen creating the explosive risk of hydrogen-oxygen mixtures. Accordingly, it would be desirous to have a refueling system wherein gaseous oxygen is not produced when the system is dispensing hydrogen thereby avoiding possible mixing of gaseous hydrogen and gaseous oxygen.

Additionally, hydrogen gas produced from the electrolytic cell described by Fairlie et. al is produced at an elevated temperature. Fairlie et al teaches away from the use of hydrogen storage tanks identifying them as a "potential safety risk" and teaches the simultaneous generation and dispensing of hydrogen. It is a well established principal of physics that the density of hydrogen gas is inverse to the temperature. In-fact, Fairlie notes that there is a problem of obtaining a false value of a high pressure fill (full tank) if the filling is too rapid due to temperature increase within the tank. At a constant pressure, the greater the temperature of the gaseous hydrogen, the lower the density of the gaseous hydrogen thus creating a false value. Fairlie's temperature management solution is to wait for the external vessel to cool down by modulating the rate of fill.

Achieving a full fill, as noted by Fairlie, is particularly applicable to hydrogen fueled, fuel cell powered vehicles. The operating range (distance) a fuel cell powered vehicle can potentially travel is related to the quantity of hydrogen on board. A second variable equally applicable to promoting the operation of fuel cell powered vehicles is that sufficient quantity of hydrogen to support a preselected operating range is dispensed in a time frame which is within the "convenience expectations" of an end user. It is therefore desirous to have a hydrogen refueling station which manages the temperature of the gaseous hydrogen to minimize reductions in rate of fill.

Trailers transporting pressurized cylinders of gas are known in the art. Large semi-tanker/trailers for transporting gaseous fuels are also known in the art. Semi-tankers are not a convenient method for providing transportable hydrogen for refueling. Specifically, the use of a semi-tanker requires a specialized driver's license and due to weight and size restrictions, a semi-tanker may be limited to use on some roadways and may have limited access to some locations. A small trailer suitable for towing by a passenger vehicle which can transport upwards of 35 kg of hydrogen would solve many of the limitations of a semi-tanker.

SUMMARY OF INVENTION

A refillable hydrogen refueling station within an enclosure that can dispense upwards of 35 kg of hydrogen is taught. Gaseous hydrogen is stored at high pressure without the use of heavy tanks, hydrides or metal alloys. The refueling station within the enclosed one can be trailer supported. The trailer supported enclosure or the refueling station within an enclosed trailer can be towed by a passenger vehicle.

The energy density of a system for transporting hydrogen could be measured as grams/liter of stored gas as done by Ovshinsky in the U.S. Pat. No. 6,305,442 patent, however, such a measurement can be misleading when transportability of the hydrogen is a factor. For transportable hydrogen, a useful measure of energy density is grams of hydrogen per pound (gms/lb) of the gross weight of the transportable system.

The hydrogen refueling station accepts a hydrogen feed stock, increases the pressure of the hydrogen up to a desired pressure, and stores the hydrogen in one or more tanks for later dispensing. Distribution of the hydrogen is through a reversible connector that can dispense the hydrogen from the tanks to a receiving tank or apparatus.

In one embodiment, the hydrogen refueling station is self-refilling. It has a hydrogen producing subsystem which can also refill the tanks within the refueling station's hydrogen storage subsystem. The self-refilling function is provided by a hydrogen generating device such as an electrolyzer or electrolytic cell.

To reduce the risk of the gaseous oxygen, produced as a by-product of hydrogen generation, from mixing with gaseous hydrogen the hydrogen refueling station can be operated to produce and store hydrogen in the storage tanks at a time remote and distinct from the dispensing of the hydrogen. Connections from the hydrogen producing subsystem to the hydrogen storage tanks are fixed and easily monitored for leaks as opposed to the temporary connections made by the reversible connector.

Common to the embodiments described herein is temperature management of the hydrogen. Hydrogen produced by an electrolyzer or electrolytic cell is produced at temperature elevated above ambient. This elevated temperature decrease the density of the hydrogen gas. To provide a higher density of the hydrogen gas the elevated temperature of the hydrogen produced can be reduced by cooling the hydrogen as it flows and not simply reducing the rate of fill.

Temperature management can result in higher density of the hydrogen gas, which equates to more grams of hydrogen. The quantity of hydrogen dispensed to the end user, and the rate at which it is dispensed, should meet the reasonable convenience expectations of the end user.

Most preferably the time it should take to refill a fuel cell powered vehicle will be similar in duration to the time it takes to refuel an automobile with gasoline. Further, the quantity of hydrogen dispensed should have the potential to power a fuel cell powered vehicle a range of travel also within the reasonable convenience expectations of an end user.

In some instance the hydrogen storage tanks may be by-passed and the hydrogen from the hydrogen producing subsystem cooled and dispensed directly to an end user.

The electrolyzer may be powered by renewable source including to not limited to wind, hydroelectric and solar. Electricity from turbines and/or Photovoltaic panels can be connected to the electrolyzer or electrolytic cell to support hydrogen generation.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appended claims.

BRIEF DESCRIPTION OF THE DRAWINGS

FIG. 1A is an overview of the transportable hydrogen refueling station.

FIG. 2A is a partially cutaway view of a transportable hydrogen refueling station.

FIG. 2B is a table comparing the capacity of different configurations of the transportable hydrogen refueling station of FIG. 2A.

FIG. 3B is a table of the specifications for the semi-tanker of FIG. 3.

FIG. 5B is a table comparing the capacity of different configurations of the hydrogen refueling station of FIG. 5A.

THE PREFERRED EMBODIMENTS OF THE INVENTION

Figure 1B:
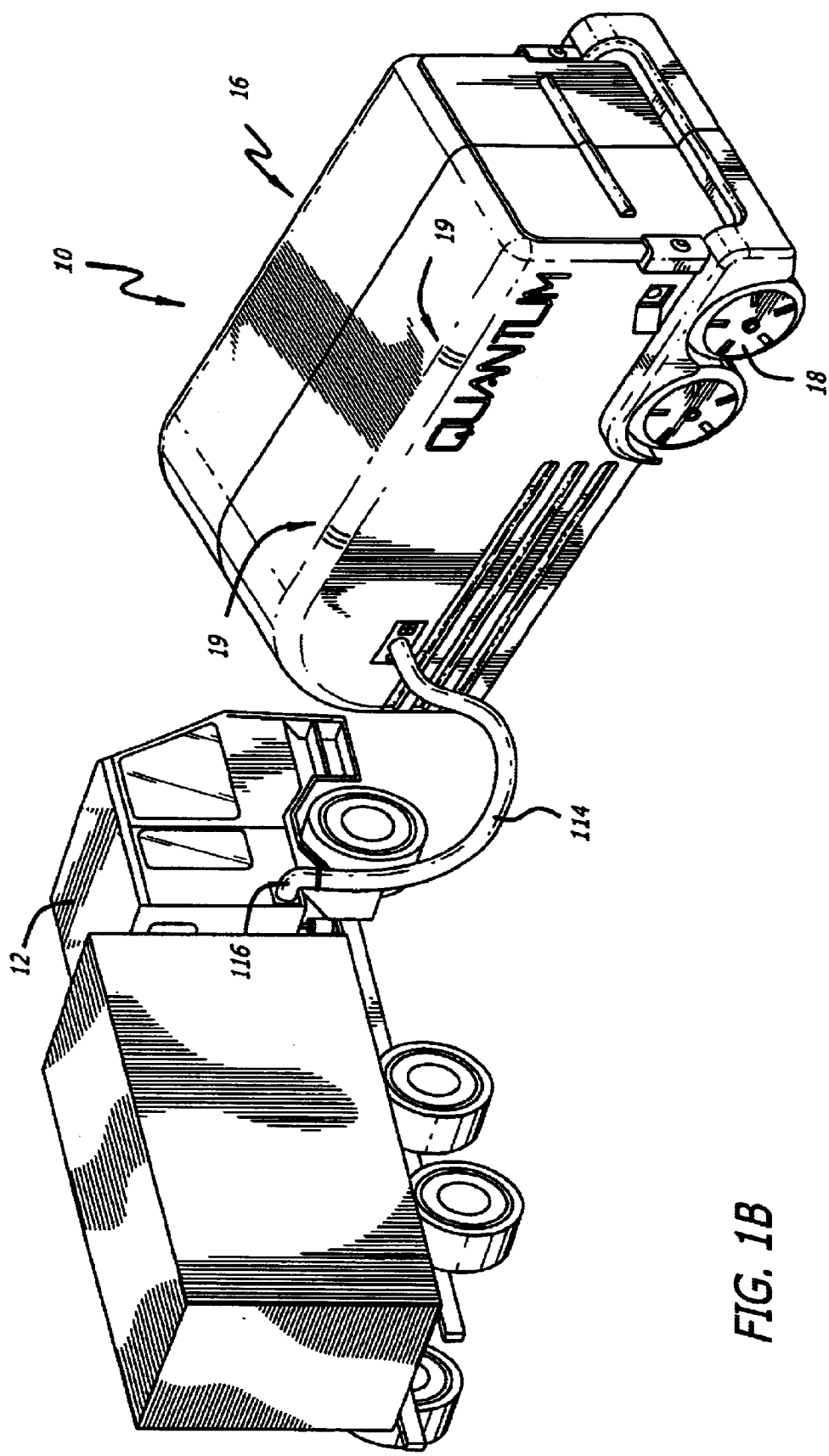
FIG. 1B is an overview of the transportable hydrogen refueling station in use.

A hydrogen refueling station 10 shown in FIGS. 1A, 1B and 2A is transportable. The hydrogen refueling station 10 or "hydrogen hauler" is useful to provide pressurized hydrogen gas to external hydrogen storage vessels. Those vessels may be part of a hydrogen powered motor vehicle 12.

The refueling station 10 is constructed on a substantially flat base 14, which supports a lightweight shell 16 into which the hydrogen storage, pressurization and distribution systems, are placed. An enclosure with its own base that can be detached or removed from the base 14 can be substituted for the lightweight shell 16. The base 14 is supported by axle mounted wheels 18. Vents 19 placed along the upper regions of the lightweight shell 16 allow any build up of gases to escape the shell 16.

The table provided in FIG. 2B indicates that the hydrogen refueling station 10 has a curb weight of under 5,500 pounds. The low curb weight is, in part, achieved by fitting the refueling station 10 with lightweight internal hydrogen storage tanks 100. Thus the refueling station 10 can be towed by a passenger vehicle.

Lightweight internal hydrogen storage tanks 100 should have a pressure rating of up to about 10,000 psi or more and a failure rating, or burst rating, of at least 2.25 times the pressure rating. One such hydrogen storage vessel is the Dynecell available from Dynetek Industries, Ltd. in Alberta, Canada. Another lightweight hydrogen storage vessel is the Tri-Shield available from Quantum Technologies, Inc. in Irvine, Calif.

The table provided in FIG. 2B indicates that a refueling station 10 with a curb weight of about 4,000 lbs (option A) should have a capacity of up to about 40 kg of hydrogen. The energy density measured as curb weight/quantity hydrogen for the 4,000 lb trailer is about 10 gm/lb (40,000 grams/4,000 lbs). A transportable hydrogen refueling station with a curb weight of about 5,500 lbs (option B) and a capacity of about 80 kg of hydrogen has an energy density of about 14.5 gm/lb (80,000 gm/5,500 lbs).

Figure 3A:
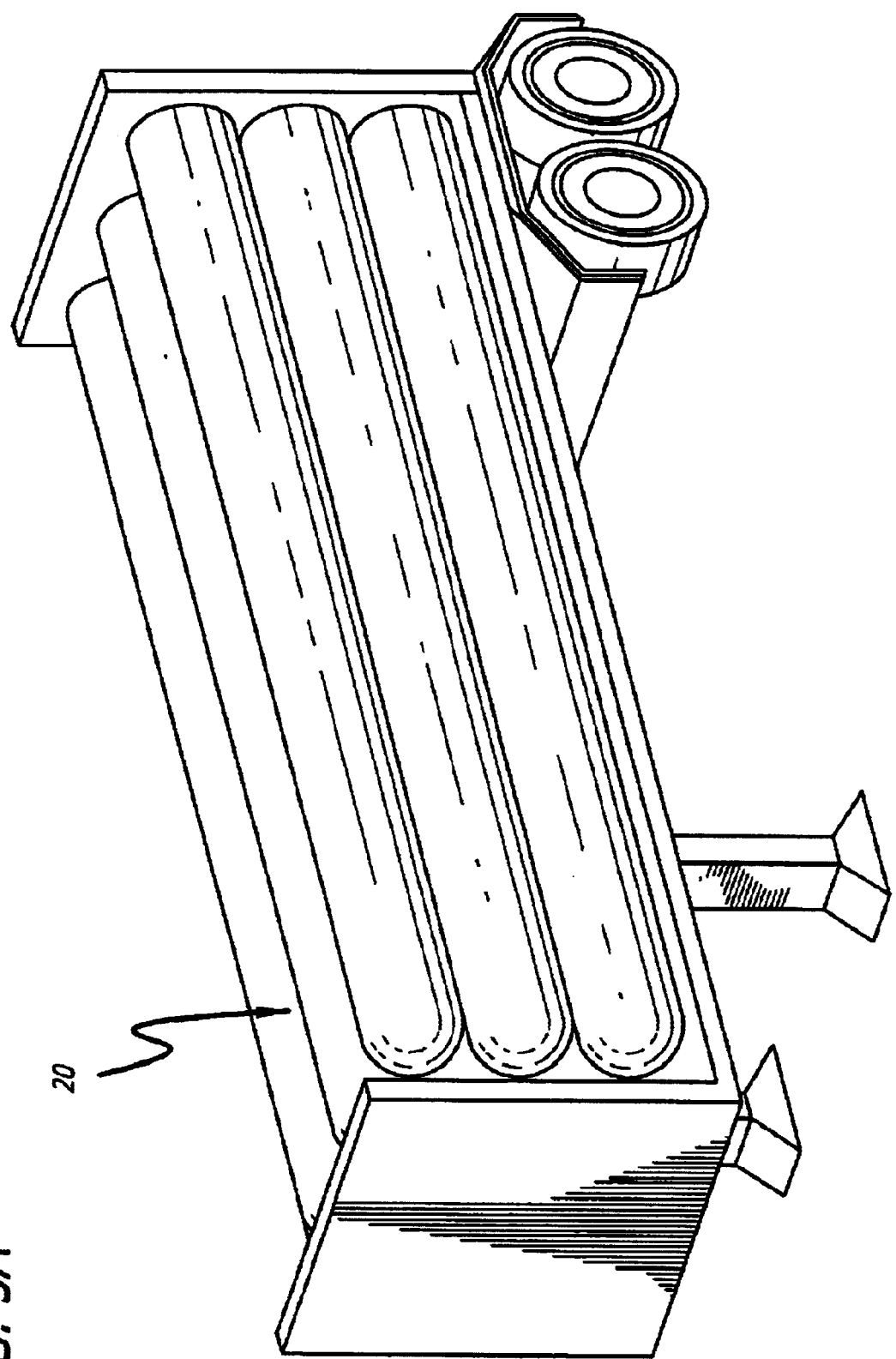
FIG. 3A is a semi-tanker.

Conversely, a traditional tanker 20 for transporting hydrogen shown in FIG. 3A, the hydrogen filled tanker 20, according to its specifications provided in the table of FIG. 3B only has an energy density of about 5.3 gm/lb (320,000 gms/60,000 lbs). The refueling station 10 therefore has an energy density about twice the energy density of the semi-tanker.

Figure 4:
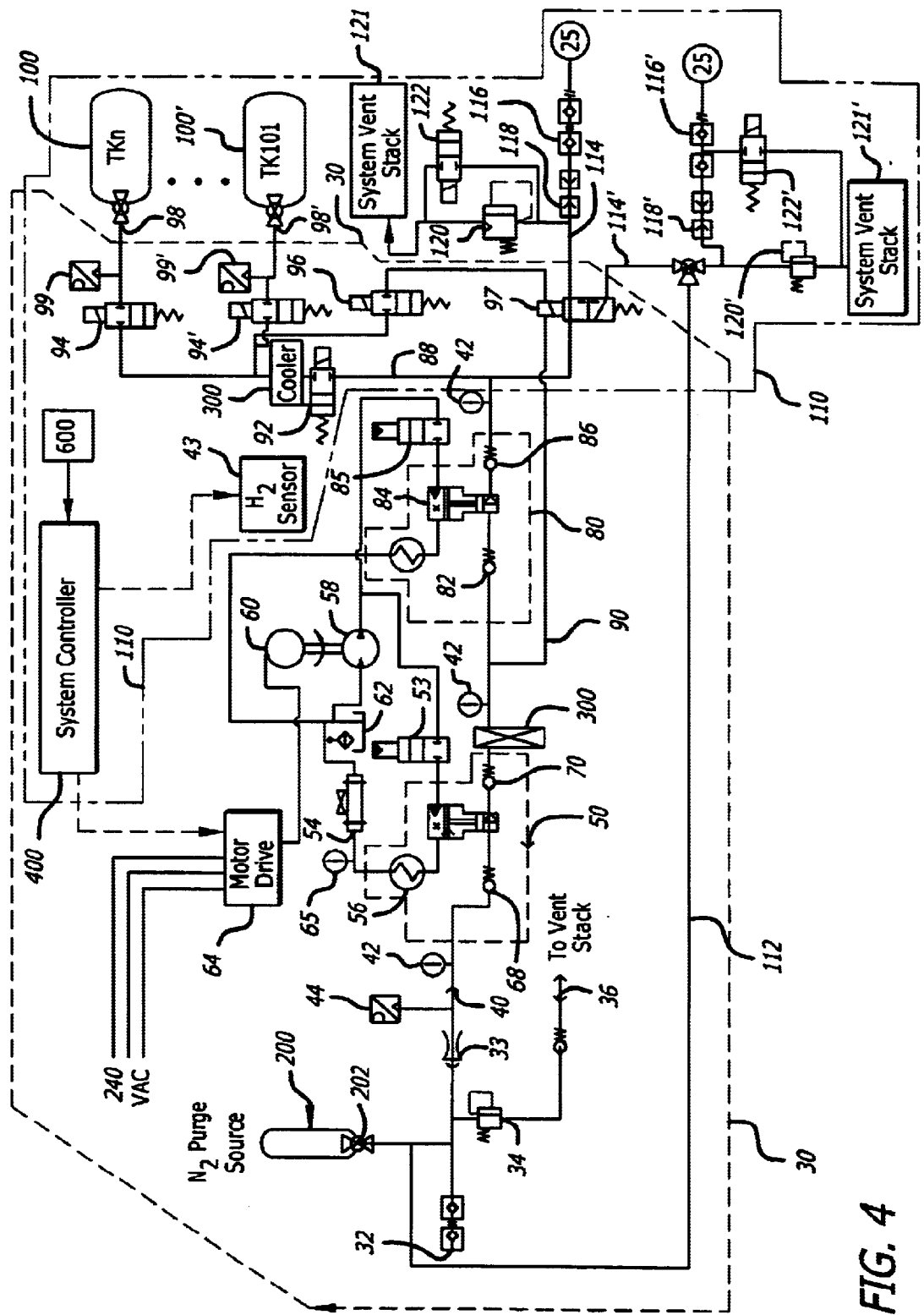
FIG. 4 is a schematic of a transportable hydrogen refueling station.

FIG. 4 is a schematic of the refueling station 10. The refueling station 10 can be used to refuel a variety of external hydrogen storage vessels and is not limited to supplying hydrogen to fuel cell powered vehicles, although such vehicles are one focus of the invention.

Filling the Refueling Station

Before the refueling station 10 can be used to supply hydrogen to an external hydrogen storage vessel 25, the internal hydrogen storage tanks 100 in the refueling station 10 must be filled. A hydrogen storage subsystem 30 is provided within the transportable hydrogen refueling station 10 to refill or charge the lightweight composite hydrogen storage tanks 100, a quick connect 32, which can be any standard hydrogen connector, is used to connect an external hydrogen source to hydrogen storage subsystem 30., Downstream from the quick connect 32 is a pressure release valve 34. The pressure release valve 34 is a safety element to prevent hydrogen, at a pressure exceeding a pre-determined maximum, from entering the hydrogen storage subsystem 30. If the pressure of hydrogen being introduced through the quick connect 32 exceeds a safe limit a restricted orifice 33 working in combination with a pressure relief valve 34 causes the excess hydrogen to be vented through a vent stack 36. In general, the valves are used to affect the flow of hydrogen within the refueling station. A check valve 38, between the vent stack 36 and pressure relief valve 34, maintains a one way flow of the flow of pressurized hydrogen being relived from the storage subsystem 30. The restrictive orifice 33 also prevents the hydrogen from entering the pressure rated feed line 40 at a rate which causes extreme rapid filling of the lightweight hydrogen storage tanks 100. Prior to connecting the quick connect 32 nitrogen gas, or other inert gas can be introduced into the feed line 40 to purge any air from the feed line. Pressurized nitrogen dispensed from a nitrogen tank 200 can be introduced through a nitrogen filling valve 202.

The feed line 40 should be constructed of stainless steel and typically has a safety margin of 4. Safety margins for a pressurized hydrogen gas line are a measure of burst pressure to operating pressure.

It is important to control the rate of fill of the hydrogen storage tanks 100 and in general the temperature of the gaseous hydrogen. Although a rapid fill is desired, physics dictates that as you increase the fill rate, all things being equal, an elevation in temperature will occur. With an elevation in temperature there is a corresponding decrease in the mass of hydrogen that can be stored at a predetermined input pressure. Accordingly, if the hydrogen entering the hydrogen storage tanks 100 is at an elevated temperature the density of the gaseous hydrogen will also be reduced. Cooling the gaseous hydrogen, by directing it through a cooling unit 300, is used to reduce temperature elevations.

The cooling unit 300 in this embodiment is a finned tube type heat exchanger, however, other heat exchangers, coolers, or radiators which can manage the temperature of the gaseous hydrogen may be used. Temperature is measured at various places on the feed line 40 by temperature sensors 42 which are monitored by a system controller 400 which is typically based on a 8–32 bit microprocessor.

Connections between the feed line 40 sensors, valves, transducers, inlet or outlets, should be constructed to minimize any potential for leakage of hydrogen. Common construction techniques include welds, face seals, metal to metal seals and tapered threads. One or more hydrogen leak sensors 43 are also distributed and connected to the system controller 400. The pressure of the gaseous hydrogen is measured by one or more pressure sensors 44 placed in the feed line 40. No specific sensors is called out for but generally the sensor may be a transducer, or MEMS that incorporate polysilicon strain gauge sensing elements bonded to stainless steel diaphragms. The temperature and pressure of the hydrogen, entering the pressure rated feed line 40 can be checked as it passes into the first compressor subsystem 50.

The first compressor subsystem 50 contains an oil cooled first intensifier 52. An intensifier switch 53, connected to the system controller 400, controls the start/stop function of the first intensifier 52. An oil to air heat exchanger 54 for cooling hydraulic oil which is supplied to a first intensifier heat exchanger 56 to cool the first intensifier 52. A hydraulic pump 58, powered by a brushless motor 60, supplies cooling oil from an oil reservoir 62 to the first intensifier heat exchanger 56. A speed control 64 for the brushless motor 60 is provided. A brushless motor 60 is preferred to eliminate the risk of sparks. The system controller 400 receives data from the oil temperature sensor 65, the gaseous hydrogen temperature sensors 42, the gaseous hydrogen pressure sensors 44, and the hydrogen leak sensors 43. The system controller 400 in turn is used to, among other things, effect the speed control 64.

The intensifier is a device, which unlike a simple compressor, can receive gas at varying pressures and provide an output stream at a near constant pressure. However, it may be suitable in some cases to use a compressor in place of an intensifier. The first intensifier 52 increases the pressure of the incoming gaseous hydrogen about four fold. Within the first compressor subsystem 50, hydrogen gas from the feed line 40 enters the first intensifier 52 through an inlet valve 68. The gaseous hydrogen exits the first intensifier through an outlet check valve 70. At this point, the gaseous hydrogen is directed through a cooling unit 300 to manage any temperature increases in the gaseous hydrogen. The gaseous hydrogen passing through the cooling unit 300 may be directed to enter a second compressor subsystem 80 or into a by-pass feed line 90.

If entering the second compressor subsystem 80 the gaseous hydrogen passes through an inlet check valve 82 which directs it to the second intensifier 84. An intensifier switch 85, connects to the system controller 400, and controls the start/stop function of the second intensifier 84. The gaseous hydrogen exits the second intensifier 84 through an outlet check valve 86 and is directed down the inlet/outlet line 88 to a line control valve 92 which directs the gaseous hydrogen through a cooling unit 300 and into the inlet/outlet control valves 94 and 94' for the lightweight composite hydrogen storage tanks 100 and 100'.

The dual compressor sub-systems 50 & 80 are not a limitation. If the storage pressure for the hydrogen gas can be achieved with a single compressor sub-system, the second compressor subsystem can be bypassed or eliminated. By closing the inlet check valve 82 to the second intensifier 84, the gaseous hydrogen exiting the first intensifier 52 is directed through the by-pass feed line 90 and to a by-pass inlet/outlet control valve 96 which directs the flow of gaseous hydrogen to the lightweight composite hydrogen storage tanks 100 and 100'. Conversely, in those instances where storage pressure exceeding that which can be efficiently achieved with dual intensifiers is desired, additional intensifiers can be added.

EXAMPLES

The following examples are given to enable those skilled in the art to more clearly understand and to practice the present invention. They should not be considered as limiting the scope of the invention, but merely as being illustrative and representative thereof.

Example 1

If the external hydrogen feed gas is supplied to the hydrogen storage subsystem 30 at approximately 1,000 psi then the first compressor subsystem 50 can increase the pressure of the hydrogen gas by up to about four times which would be as high as approximately 4,000 psi. However, if the desired storage is about 10,000 psi then the gaseous hydrogen is directed by the actions of the system controller 400 (i.e. opening and closing valves) from the first compressor subsystem 50 to the second intensifier subsystem 80.

The pressure of gaseous hydrogen which enters the second compressor subsystem 80 at about 4,000 psi can be increased to achieve the desired 10,000 psi. As an additional fail safe, manual control valves 98 and 98' may be affixed to each of the lightweight composite hydrogen storage tanks 100 and 100' to physically prevent the flow of hydrogen gas in or out of the lightweight composite hydrogen storage tanks 100 and 100'.

The system controller 400 can be used to maintain balance during the refilling of the lightweight composite hydrogen storage tanks 100 and 100' by monitoring the pressure of each of the lightweight composite hydrogen storage tanks 100 and 100' via adjacent pressure sensors 99 and 99'. The system controller 400, in turn can switch between storage tanks and select which tank to fill at a given time interval during the filling.

Example 2

If the external hydrogen feed gas is supplied to the hydrogen storage subsystem 30 at approximately 3,300 psi then the first compressor subsystem 50 can increase the pressure of the hydrogen gas by up to about four times which would be as high as approximately 9,900 psi. Accordingly, if the desired storage pressure of the hydrogen gas in the lightweight hydrogen storage vessels is about 10,000 psi the second compressor subsystem can be by-passed by keeping the inlet check valve 82 closed and directing the hydrogen gas to the by-pass inlet/outlet control valve 96.

Self-Filling Refueling Station

Figure 5A:
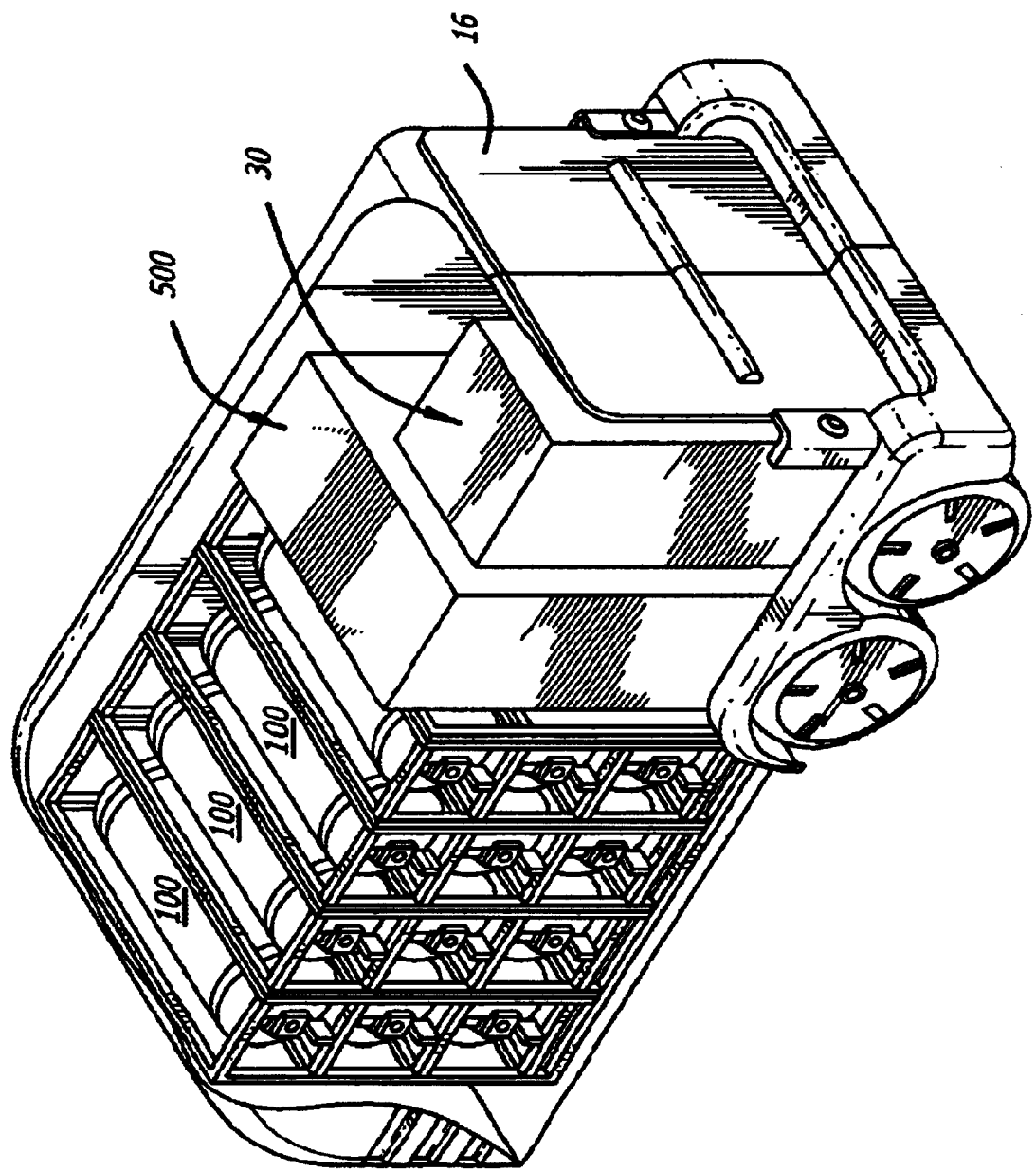
FIG. 5A is a partial cutaway view of a self fueling transportable hydrogen refueling station.

In another embodiment shown in FIGS. 5A and 5B a hydrogen producing subsystem 500 is part of the hydrogen storage subsystem 30. The hydrogen producing subsystem 500, in this embodiment, is comprised of a KOH electrolyzer module 502 and a cooling module 504. One suitable KOH electrolyzer is a IMET electrolyzer manufactured by Vandenborre Hydrogen Systems. The cooling module 504 should be sufficient to reduce the temperature to at or below ambient for maximum volume in the pressure rated hydrogen storage tanks 100. The cooling module 504 may be a closed loop cooler, receive a water input, or use heat exchangers and or radiators.

The hydrogen producing subsystem 500 is affixed to the pressure rated feed line 40 upstream from the pressure release valve 34. A hydrogen production controller (HPC) 550 can receive data from the oil temperature sensor 65, the gaseous hydrogen temperature sensors 42, the gaseous hydrogen pressure sensors 44 and the hydrogen leak sensors 43. The HPC 550 in turn is used to, among other things, switch on and off the electrolyzer module 502 and can also effect the speed control 64.

A polymer electrolyte membrane (PEM) cell may be substituted for the IMET electrolyzer. A PEM electrolyzer splits hydrogen from a water source and generates a hydrogen gas stream. Both the electrolyzer and the polymer electrolyte membrane are known in the art and therefore a detailed description of their construction is not necessary. Gaseous hydrogen produced by a PEM electrolyzer is also generated at a temperature which is elevated above ambient.

Refueling From the High Pressure Tanks

The refueling station 10 can be towed to a desired location. It can also be disconnected from the tow vehicle (FIG. 1A), or it can be transported from place to place.

The hydrogen fueling subsystem 110 is used to refuel an external hydrogen storage vessel 25 with pressurized hydrogen from the refueling station 10. As the refueling begins after the system controller 400 will check pre-identified parameters, such as, temperature and pressure of the external hydrogen storage vessel, confirmation of ground connection and in some cases, confirmation from vehicles of readiness to fill, in order to determine whether hydrogen should be dispensed to the external hydrogen vessel 25.

The actual hydrogen refueling process can be preceded by safety measures. Pressurized nitrogen, or other inert gas, may be introduced through a purge line 112 into the hydrogen dispensing feed lines 114 and 114' to purge any air from the hydrogen dispensing feed lines 114 and 114'. The purge is to manage the risk of dangerous hydrogen-air (oxygen) mixtures being formed and or being supplied to the external hydrogen vessel 25. Purge pressure relief valves 120 and 120' are appropriately located to vent gas from the hydrogen dispensing feed lines 114 and 114'. In this embodiment, the system controller 400 also controls the nitrogen valve 202.

The fill couplers 116 and 116' can be any industrial or any standard hydrogen fill connector. A suitable fill connector is WEH TK 15 hydrogen fill nozzle by WEH of Germany in combination with a WEH-TN1 receptacle. Each fill coupler 116 and 116' is connected to the refueling station 10 via break away couplers 118 and 118'. A break away coupler 118 is another safety element not uncommon to refueling systems. A purge pressure relief valve can vent hydrogen to a vent 121 and 121' from the hydrogen dispensing line if a break away coupler is decoupled.

One proposed industry standard for a fuel cell vehicle fill coupler is described in the proposed "Fueling Interface Specification" prepared by the California Fuel Cell Partnership that description which is hereby incorporated by reference. The fill coupler, indicated in the proposed "Fueling Interface Specification", has a "smart" connect which, among other parameters, checks the pressure, temperature and volume of hydrogen within the tanks of a vehicle 12 (the external hydrogen storage vessel 25) being refueled. It will also check that the vehicle is grounded.

The "smart" fill coupler can communicate with the refueling station 10 through the system controller 400 or other data processor, controller and or computer (not shown). A user interface panel 600 may also be provided whereby the user may confirm conditions, enter data or otherwise communicate with the refueling station 10.

After the external hydrogen vessel 25 and the fill coupler 116 are connected, recharging or filling of the hydrogen receptacle can occur. The fill coupler should meet or exceed the appropriate governmental or industry mechanical specifications to fill the hydrogen storage vessel at a pressure not to exceed any predetermined pressure rating thereof.

When refueling or recharging an external hydrogen storage vessel 25 preferably a map of the external hydrogen vessel 25 should be obtained. A map should check the temperature, volume and pressure of the hydrogen gas in the external hydrogen vessel 25 and the volume pressure and temperature of the hydrogen in each lightweight composite hydrogen storage tanks 100 and 100'. It is also envisioned that the map may include information about the pressure rating and capacity of the external hydrogen vessel 25. The pressure rating and capacity information could alternatively be input on the interface panel 600 and or transmitted via a smart connect. External hydrogen vessel 25 identification information could be received by the system controller 400 which can use a look up table (LUT) to set the refueling parameters.

One pathway of the hydrogen gas being dispensed is from the pressure rated tanks 100 and 100', via the inlet/outlet control valves 94 and 94', through the cooling unit 300, then via the line control valve 92 into the inlet/outlet feed line 88.

The cooling unit 300 can reduce the temperature of the hydrogen gas by about at least 20° C., more preferable by about at least 40° C. and most preferably by about at least 80° C.

By controlling the temperature of the hydrogen gas during refueling a faster refueling can take place. If the temperature of the hydrogen in the external hydrogen vessel 25 increase past ambient the volume of hydrogen which the external hydrogen vessel 25 can store is decreased. If the temperature increase is as little as about 20° C. from 20 to 40 volume may be decreased by about 6%. If that temperature increase is about 40 degrees volume may be decreased by about 12%. If the temperature increase is about 80 degrees volume may be decreased by about 22%.

Temperature management supports faster dispensing of dense gaseous hydrogen. An end user or consumer may have convenience expectations such as a reference on the time interval it took to refuel a gasoline powered combustion automobile, and how the combustion automobile could travel on the quantity of gasoline received during the time interval. To meet convenience expectations, a hydrogen refueling station should dispense enough hydrogen (grams), in a similar time interval, to potentially travel a similar distance.

The hydrogen gas, in the inlet/outlet feed line 88, is directed to one or both of the hydrogen dispensing feed lines 114 and 114' via a dispensing line check valve 97.

When dispensing the gaseous hydrogen, the system controller 400 can be used to select between the lightweight composite hydrogen storage tanks 100 and 100' by comparing pressure in the lightweight composite hydrogen storage tanks 100 and 100' and the external hydrogen storage vessel 25 to balance the pressure. Pressure balancing between sources is a known mechanism used to more efficiently dispense gaseous fuels from multiple pressurized sources. The system controller 400 controls the control valves and check valves during the dispensement of hydrogen (refueling) to an external hydrogen vessel 25. Refueling can normally continue until an external hydrogen storage vessel 25 reaches a selected or predetermined fill pressure.

At the completion of refueling, in conjunction with decoupling a fill coupler 116 or 166' from an external hydrogen vessel 25 or 25', a decoupling control valve 122 or 122' directs the hydrogen, in that portion of a hydrogen dispensing feed lines 114 or 114' via break away couplers 118 or 118' and fill coupler 116 or 166', to a vent 121 or 121'. Venting the hydrogen will depressurize the portion of the hydrogen dispensing feed lines 114 or 114' connected to the fill coupler 116 or 166'.

Refueling Direct

Figure 6:
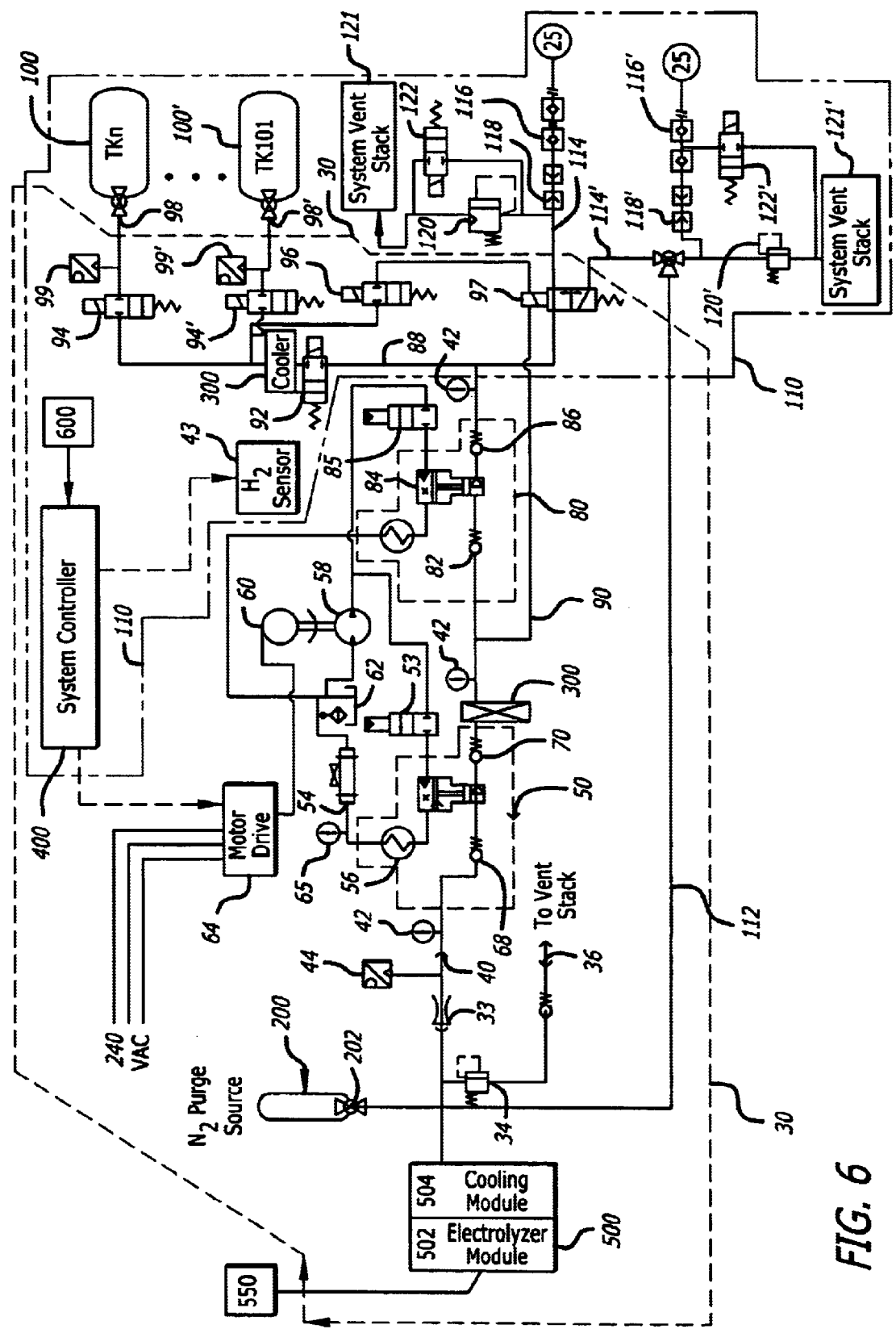
FIG. 6 is a schematic of a self fueling transportable hydrogen refueling station.

The embodiment shown in FIG. 6 can also be used to dispense gaseous hydrogen directly to an external hydrogen storage vessel 25. The system controller 400 can shut off the inlet/outlet control valves 94 and 94' and direct the gaseous hydrogen from the first or second compressor subsystems 50 or 80 through the inlet/outlet feed line 88.

During a direct re-fill the gaseous hydrogen from the electrolyzer module 502 passes through the cooling module 504 to reduce the elevated temperature of the gaseous hydrogen produced by the electrolyzer module 502. At this point, without any further cooling the dispensed hydrogen will have a greater density than hydrogen dispensed directly from the electrolyzer module 502.

To further reduce the temperature of the hydrogen exiting the cooling module, the gaseous hydrogen output from either the first or second compressor subsystems 50 or 80 passes through a cooling unit 300 before being dispensed to an end user.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A hydrogen refueling station comprising:
   a portable enclosure;
   at least one feed line whereinto hydrogen can flow;
   a hydrogen producing subsystem, which has at least a hydrogen producing unit and a hydrogen cooling unit, connected at one end to the feed line;
   at least one compressor means, within the enclose, connected to at least one feed line downstream from the hydrogen producing subsystem;
   one or more hydrogen storage tanks, within the enclosure, connected to at least one feed line downstream from at least one compressor means;
   at least one control valve connected to at least one feed line;
   at least one reversible connector, whereby hydrogen from at least one hydrogen storage tank can be dispensed;
   at least one cooling means, wherethrough hydrogen can flow; and,
   at least one system controller to control at least one control valve, at least one compressor means, and the hydrogen producing subsystem whereby the flow of hydrogen within the refueling station is affected.

2. The hydrogen refueling station of claim 1 wherein the portable enclosure is a trailer.

3. The hydrogen refueling station of claim 1 wherein the hydrogen producing unit is a KOH electrolyzer.

4. The hydrogen refueling station of claim 3 wherein the source of electrical power for the KOH electrolyzer is selected from the group consisting of turbines, wind, solar, and hydroelectric.

5. The hydrogen refueling station of claim 1 further comprising a tank of pressurized inert gas connected to at least one feed line; whereby introduction of the inert gas into the feed line will purge at least a portion of the feed line and/or the reversible connector.

6. The hydrogen refueling station of claim 1 wherein the portable enclosure is removable from a trailer.

7. A hydrogen refueling station comprising:
   a portable enclosure;
   at least one feed line whereinto hydrogen can flow;
   a hydrogen producing subsystem, which has at least a hydrogen producing unit and a cooling unit, connected at one end to the feed line;
   at least one compressor means, within the enclosure connected to at least one feed line;
   one or more hydrogen storage tanks, within the enclosure, connected to at least one feed line downstream from at lest one compressor means;
   at least one control valve connected to at least one feed line;
   at least one reversible connector, whereby hydrogen from at least one hydrogen storage tank can be dispensed;
   at least one cooling means, wherethrough hydrogen can flow;
   at least one system controller to control at least one control valve or at least one compressor means, whereby the flow of hydrogen within the refueling station is affected; and
   a second system controller to control the hydrogen producing subsystem.

8. The hydrogen refueling station of claim 7 wherein the portable enclosure is a trailer.

9. The hydrogen refueling station of claim 7 wherein the hydrogen producing unit is a KOH electrolyzer.

10. The hydrogen refueling station of claim 9 wherein the source of electrical power for the KOH electrolyzer is selected from the group consisting of turbines, wind, solar, and hydroelectric.

11. The hydrogen refueling station of claim 7 wherein the portable enclosure is a trailer.

12. The hydrogen refueling station of claim 7 wherein the portable enclosure is removable from a trailer.

13. The hydrogen refueling station of claim 7 further comprising a tank of pressurized inert gas connected to at least one feed line; whereby introduction of the inert gas into the feed line will purge at least a portion of the feed line and/or the reversible connector.

* * * * *

UNITED STATES PATENT AND TRADEMARK OFFICE
CERTIFICATE OF CORRECTION

PATENT NO. : 6,755,225 B1
DATED : June 29, 2004
INVENTOR(S) : Niedzwieki et al.

It is certified that error appears in the above-identified patent and that said Letters Patent is hereby corrected as shown below:

Title page,
Item [75], Inventors, please replace the word "Niedwiecki" with -- Niedzwiecki -- to read "Alan Niedzwiecki, Newport Beach, CA".

Signed and Sealed this

Fourteenth Day of December, 2004

JON W. DUDAS
*Director of the United States Patent and Trademark Office*